United States Patent Office 2,840,596
Patented June 24, 1958

---

2,840,596

PROCESS FOR THE PREPARATION OF 4-CARBO-ALKOXY-2-CHLOROBUTYRIC ACIDS

Arthur Francis Kirby, Woodbury, N. J., assignor to E. I. du Pont de Nemours and Company, Wilmington, Del., a corporation of Delaware No Drawing. Application December 28, 1956
Serial No. 631,035

3 Claims. (Cl. 260—485)

The present invention relates to the production of useful chloro compounds and, more particularly, to the production of novel α-chloroglutaric acid derivatives.

DL-glutamic acid, a precursor for the monosodium salt of L-glutamic acid now in wide use as a flavor-enhancing agent in foods, can be prepared readily from α-chloroglutaric acid and certain of its derivatives. This preparation of DL-glutamic acid, which is described in assignee's copending application Serial No. 631,037, filed December 28, 1956, involves treatment of the α-chloro acid or one of its derivatives with aqueous ammonia at a temperature between 150 and 275° C. under autogenous pressure. Hence, a need exists for an economical method of producing α-chloroglutaric acid and derivatives.

Accordingly, an object of the present invention is to provide a process for the preparation of α-chloroglutaric acid derivatives. A further object of the present invention is to provide a process for the preparation of 4-carboalkoxy-2-chlorobutyric acids. Other objects will become apparent as the invention is further described.

I have found that the foregoing objects may be achieved when I cause chlorine to react with a monoalkyl ester of glutaric acid in the presence of a suitable catalyst.

In accordance with the process of the invention, chlorine is caused to react with a monoalkyl ester of glutaric acid wherein the alkyl group contains from 1 to 4 carbon atoms, e. g., the monomethyl ester, in the presence of a phosphorus-containing catalyst consisting of phosphorus or a phosphorus halide, oxyhalide, oxygen acid, or oxide, the reaction being effected at a temperature between about 50 and about 140° C.

The following examples illustrate specific embodiments of the method of carrying out the process of the invention. However, they should not be construed as limiting the invention in any manner. The parts in the examples are parts by weight.

*Example 1*

The monomethyl ester of glutaric acid, in the amount of 58.4 parts and 3.1 parts of phosphorus trichloride were charged to a reactor equipped with a stirrer, a thermometer, and a condenser. The contents of the reactor were heated to 95 to 100° C., and chlorine gas was introduced at the rate of approximately 0.3 part per minute. After two hours, approximately the stoichiometric quantity of chlorine had reacted and the index of refraction of the crude product was 1.4617 at 25° C. The chlorine addition then was stopped, residual hydrogen chloride was flushed from the reactor by a stream of nitrogen, and the crude chlorination product was found to amount to 72.8 parts. Water in the amount of 0.3 part was added to a 20.0-part portion of this product, in order to convert any acid chloride formed in the reaction to the corresponding acid. The resulting mixture was allowed to stand for approximately one and one-half hours at room temperature. The temperature of the mixture then was raised to 100° C., and hydrogen chloride was removed with the aid of the vacuum produced by an aspirator. The product was distilled to give a heart cut of 4-carbomethoxy-2-chlorobutyric acid (B. P. 138–140° C. at 0.5 mm., $n_D^{25}$ 1.4618) amounting to 14.3 parts or a conversion of 72%, based on the sample of crude chlorination product. The analysis for $C_6H_{10}O_4Cl$ was:

Calculated: C, 39.9; H, 5.0; Cl, 19.6. Found: C, 39.7; H, 4.9; Cl, 19.7.

Confirmatory evidence for the structure of the 4-carbomethoxy-2-chlorobutyric acid was obtained when the acid was heated for 9 hours at 225° C. with aqueous ammonia by the method described in assignee's copending application mentioned above and DL-glutamic (DL-α-aminoglutaric) acid thereby was obtained.

The monomethyl glutarate used in the foregoing run was produced in the following manner. A mixture of 402.4 parts of glutaric anhydride and 134 parts of anhydrous methanol was charged to a reactor equipped with a reflux condenser and a thermometer, and the mixture was refluxed on a steam bath. When the temperature of the mixture reached approximately 95° C., a sudden rise in temperature occurred and the reactor was cooled quickly to prevent the temperature from exceeding 130° C. The reaction product was allowed to cool to room temperature and then was distilled under vacuum. A heart cut comprising 484 parts (94% conversion) of crude monomethyl glutarate (B. P. 120–130° C. at 0.7–0.8 mm., $n_D^{25}$ 1.4365) was obtained.

*Example 2*

Dry chlorine gas was passed at the rate of about 0.15–0.23 part per minute into a stirred mixture of 29.2 parts of monomethyl glutarate and 0.3 part of red phosphorus. The temperature of the reaction mixture was maintained at 95 to 110° C. When the index of refraction (at 25° C.) of the reaction mixture reached 1.4614, the chlorine flow was stopped and the residual portion of hydrogen chloride was removed by flushing the reactor with nitrogen. The product was worked up as in Example 1. Distillation yielded 33.9 parts of 4-carbomethoxy-2-chlorobutyric acid, a conversion of 94% based on the monomethyl glutarate charged.

As the foregoing examples illustrate, chlorination of the monomethyl ester of glutaric acid by the process of the present invention gives high yields of 4-carbomethoxy-2-chlorobutyric acid, a previously unknown compound which is readily convertible to the useful DL-glutamic acid by the process of assignee's copending application mentioned above.

The process of the invention can be effected in the temperature range of about 50 to about 140° C. At temperatures below about 50° C., the reaction occurs so slowly as to be economically unattractive, and the use of temperatures above approximately 140° C. leads to undesirable side reaction. However, as is illustrated by the examples, I prefer to operate the present process in the range of about 95 to about 110° C.

Preferably, the reaction is allowed to proceed for such time as required for a stoichiometric amount of chlorine to react with the monoalkyl glutarate. Hence, the reaction time used is not critical but is dependent on the rate of chlorine addition, the temperature, and other reaction conditions generally. Although the use of stoichiometric quantities of the reactants has been exemplified and is preferred, the presence of a slight excess of the monoalkyl glutarate is not deleterious to the process of the present invention, and the unreacted ester can be recovered by conventional means.

As the examples show, phosphorus and phosphorus trichloride are suitable catalysts in the present process. However, I also may use in the process other phosphorus halides such as phosphorus tribromide and the phosphorus pentahalides, phosphorus oxyhalides such as phosphorus oxybromide and oxychloride, phosphorus oxygen acids such as phosphoric and phosphorous acids, and phosphorus oxides such as phosphorus trioxides and pentoxide.

While I have shown the present process to be particularly applicable to the preparation of 4-carbomethoxy-2-chlorobutyric acid, other 4-carboalkoxy-2-chlorobutyric acids might be prepared equally well by the present method. For ease of handling and economy, those alkyl monoesters of glutaric acid wherein the alkyl groups contain from 1 to 4 carbon atoms are preferred.

The 4-carboalkoxy-2-chlorobutyric acids prepared by the present process can be recovered easily if, for example, a small amount of water is added to the crude reaction product and the mixture is distilled.

The essential overall reaction of the present invention may be represented by the following equation:

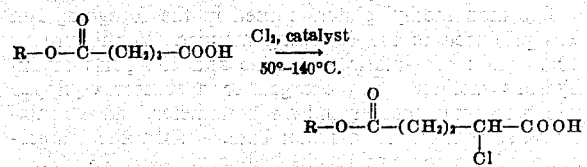

wherein R is a lower alkyl radical.

The present process has been described in detail in the foregoing. As will be apparent to those skilled to the art, however, many modifications are possible without departure from the spirit and scope of the invention. I intend, therefore, to be limited only by the following claims.

I claim:

1. A process for the production of a 4-carboalkoxy-2-chlorobutyric acid which comprises reacting chlorine with a monoalkyl ester of glutaric acid wherein the alkyl group contains from 1 to 4 carbon atoms, in the presence of a catalyst selected from the group consisting of phosphorus and phosphorus halides, phosphorus oxyhalides, phosphorus oxygen acids, and phosphorus oxides, at a temperature between about 50 and about 140° C., said chlorine and the said monoalkyl ester of glutaric acid being present in substantially stoichiometric quantities.

2. The process as claimed in claim 1, wherein said reaction is effected at a temperature between about 95 and about 110° C.

3. A process for the production of 4-carbomethoxy-2-chlorobutyric acid which comprises reacting chlorine with the monomethyl ester of glutaric acid in the presence of a catalyst selected from the group consisting of phosphorus and phosphorus halides, oxyhalides, oxygen acids, and oxides, said reaction being effected at a temperature between about 50 and about 140° C.

References Cited in the file of this patent

FOREIGN PATENTS 577,877     Great Britain _____ June 4, 1946

OTHER REFERENCES

Beilstein: Hand. Org. Chem. 2 (1920) p. 636.
Rao: Chem. Abstracts 31 (1937) 7401.
Schwenk et al.: J. Am. Chem. Soc. 70 (1948) 3626–7.